Patented Feb. 5, 1946

2,394,273

UNITED STATES PATENT OFFICE 2,394,273

DEFIBERING OF WET STRENGTH PAPER

Walter M. Thomas, Stamford, Conn., assignor to American Cyanamid Company, New York, N. Y., a corporation of Maine No Drawing. Application April 1, 1942, Serial No. 437,207

7 Claims. (Cl. 92—1.5)

This invention relates to the recovery of waste paper which has been treated with resins to improve its wet strength properties, and more particularly to the defibering of paper of this type to convert it into high grade paper pulp that can be reused in the manufacture of paper of good quality, either alone or in admixture with fresh paper pulp, or for any other desired purpose.

In all paper mills a certain amount of the paper is lost as trim or broke, and this constitutes a particularly serious problem in the production of resin-treated paper of high wet strength, for it is difficult or impossible to recover the stock in an ordinary broke beater by the usual methods. With the increased use of urea-formaldehyde resin and other acid-curing aminoplast resins to impart improved wet strength properties to paper a demand has arisen for a satisfactory method that can be employed to recover used paper of this type as well as the waste occurring during paper manufacture. It is a principal object of the present invention to provide an effective method of defibering and recovering paper, from the above and other sources, which has been impregnated with acid-curing aminoplast resins to improve its wet strength properties. The term "acid-curing aminoplast resin" is used to define the members of that group of acid-curing thermosetting resins which consists of melamine-aldehyde resins and urea and thiourea-aldehyde resins.

The most common methods of recovering waste paper, such as old newsprint, wrapping paper and the like involve treatment of the paper with alkalies, but I have found that such treatment cannot be used with success for the defibering of paper impregnated with acid-curing aminoplast resins. Thus, for example, I subjected a sample of the urea-formaldehyde treated kraft paper described in Example 1 to the action of an aqueous solution containing 0.625% of sodium hydroxide on the weight of the dry fiber and having a pH of 11.7. The suspension was cooked for 30 minutes at 190° F., after which the pulp was strained and washed and disintegrated by the method described in the following examples, but the disintegrated pulp contained considerable quantities of clumps or clusters of fibers and could be used only for low grade filler stock. By the process of the present invention, however, I have succeeded in defibering kraft paper and other types of paper treated with urea-formaldehyde and melamine-formaldehyde resins, and have been able to produce paper of good quality from the reclaimed fibers.

The process of my invention consists essentially in heating paper impregnated with a cured acid-curing aminoplast resin at elevated temperatures, preferably in the form of an acidified aqueous suspension of the paper, in conjunction with mechanical disintegration either during the heating, or as a separate after-treatment, or both. By this method I have succeeded in breaking up the fibers of the paper to such an extent that a water suspension of the stock contains substantially no clumps or clusters of fibers that would interfere with its reuse in the manufacture of a good grade of paper.

The temperature at which the resin-treated paper must be heated is dependent largely upon the amount of resin present in the paper and on the amount of acid or acidic material used. I have obtained good results by subjecting resin-treated paper to the action of steam under pressure at temperatures of about 250° F. without the use of any acid whatsoever, but at least a small amount of acid or acidic material must be present if the defibering process is to be conducted at temperatures at or below the boiling point of water at atmospheric pressure. On the other hand, complete disintegration of the resin-treated paper cannot be obtained even with relatively large quantities of acid unless elevated temperatures of the order of 100–130° F. are used, and the most practical method of carrying out the process of my invention therefore includes the step of heating the paper with an acidified solution at temperatures between 100° F. and 212° F., and preferably at about 130–180° F. Under these conditions a quantity of acid or acidic material sufficient to produce a pH of about 4.5–5 or less in an 0.6% suspension of the treated stock is usually satisfactory. Obviously the strength of the acid should not be so great as to destroy the cellulose. Mineral acids such as sulfuric, hydrochloric or phosphoric acids, acid salts such as sodium bisulfate, crude niter cake and the like, and salts which react acid in aqueous solutions such as ammonium sulfate, aluminum sulfate and the like may be employed.

Although the use of any acidic material as an aid in the defibering of resin-treated paper is included within the scope of the invention in its broader aspects, the use of aluminum sulfate (paper-maker's alum) is preferred for a number of reasons. Not only is this salt relatively cheap and non-corrosive to the equipment used in paper manufacture, but the alum solution can subsequently be employed as a precipitating or fixing agent during subsequent sizing of the paper pulp if desired. As will be shown in the subsequent examples, paper impregnated with either urea-formaldehyde or melamine-formaldehyde resin can be substantially completely defibered by heating at temperatures of 130–200° F. in an aqueous solution containing from 1% to 10% of aluminum sulfate, based on the weight of the paper, followed by mechanical disintegration, and excellent results have been obtained when about 3% of alum is used.

In practicing my invention commercially in accordance with the preferred modification thereof resin-treated paper of increased wet strength is soaked in water or in an alum solution for about ½ hour and about 3% of alum is then added if it was not originally present. The solution is then heated at temperatures of 100–200° F. and preferably at about 130–180° F. for about ½–1 hour or longer, depending upon the amount of resin in the paper and the amount of alum used. The paper is disintegrated either during or after the heat treatment by subjecting it to mechanical disintegration by any suitable means. Thus, for example, the recovered stock containing the alum solution may be mixed with fresh stock in the beater, in which case the alum may be usefully employed as a precipitant for rosin size or other sizes that may be added, or the paper may be charged into a separate beater used as a broke beater or defibered in the Jordan engine. On the other hand the stock may be separated from the bulk of the alum solution by a filter screen and disintegrated, and the alum solution returned for reuse in the defibering of further quantities of broke. These and other mechanical methods of disintegrating the acid-treated paper may be employed by those skilled in the art, and the invention in its broader aspects is not limited in this respect.

The invention will be described in greater detail with reference to the following specific examples. It should be understood, however, that these examples are given merely for purposes of illustration and that the invention in its broader aspects is not limited thereto.

*Example 1*

Kraft bag stock, sized in the beater with rosin size, was impregnated after partial drying with a water solution of dimethylol urea containing, as a curing accelerator, 4.7% alum on the weight of the resin. The sheet was then dried on steam-heated rolls in the usual manner; the dry paper contained 2.2% of urea-formaldehyde resin. Its dry tensile strength was 20.7 lbs.; wet strength 5.5 lbs.; wet rub 1312 times; MIT fold 892; and water-resistance (Currier size tester) 34.7 seconds.

A sample of the same kraft paper was dried without treatment with urea-formaldehyde or other resin and used in the following tests and is shown as a control in the following table. Its dry tensile strength was 20.9 lbs.; wet strength 1.9 lbs.; wet rub 93 times; MIT fold 1561; and water-resistance 27.2.

A number of test samples were made up by soaking 40 parts by weight of the paper in 2,000 parts of water for 30 minutes. Alum (papermaker's grade, iron-free) was then added to some of the samples as a 10% solution in water, using amounts varying from 1% to 10% of the dry weight of the paper. 24 parts of concentrated hydrochloric acid were added to another sample of the resin-treated paper, this amount corresponding to a 1.0% concentration by volume on the total volume of stock. The samples were then heated for 30 minutes at temperatures varying from 80° F. to 200° F. as shown in the following table.

Another sample of the dried, resin-treated kraft paper described above was heated for 1 hour at 245° F. in a pressure vessel in an atmosphere of saturated steam and was then soaked for 10 minutes in water at room temperatures. All the stock was then transferred to a standard British sheet machine disintegrator and disintegrated during 25 minutes for 75,000 revolutions of the propeller, corresponding to a reading of 3000 on the dial.

Some of the disintegrated stock from each sample was diluted with water to 0.2% in a glass graduate and evaluated by noting the quantity of unbroken fiber clusters which remained in suspension after the separated fibers had settled out. Hand sheets were prepared from pulp from each of the test samples and tested for tensile and bursting strength. The results obtained are shown in the following table.

| Percent alum | 30 min. heating temp., °F. | Defibering results | pH of 0.6% stock | Handsheets strength | |
|---|---|---|---|---|---|
| | | | | Tensile, lbs. | Mullen, lbs./sq. in. |
| Control (no resin). | 80 | Good | 6.4 | 9.0 | 34.5 |
| 0 | 80 | Very poor | 6.4 | 4.3 | 12.0 |
| 0 | 180 | Fair | 6.3 | 7.5 | 32.5 |
| 0 | [1] 245 | Good | 5.3 | | |
| 1 | 180 | ..do.. | 4.7 | 8.7 | 36.3 |
| 3 | 80 | Poor | 4.4 | 5.5 | 17.0 |
| 3 | 130 | Good | 4.3 | 7.7 | 33.0 |
| 3 | 180 | Very good | 3.9 | 8.9 | 38.3 |
| 5 | 180 | Good | 3.8 | 3.2 | 35.7 |
| 10 | 80 | Poor | 4.0 | 5.4 | 17.8 |
| 10 | 200 | Good [2] | 3.1 | | |
| 1% HCl | 170 | Good | [3] 3.5 | | |

[1] Dry paper steamed 1 hour.
[2] The stock was completely broken up after one-half of regular disintegration period.
[3] The pH during the heating was less than 2.0. The pulp was strained and washed before disintegrating.

These results show that the defibering of paper treated with urea-formaldehyde resin to improve its wet strength is a function of temperature and acidity. Satisfactory results are obtainable by prolonged heating of the resin-treated paper at high temperatures, but the addition of even small amounts of acidic substances such as free acids, acid salts, and salts of strong acids with weak bases will produce equal or better results at lower temperatures.

*Example 2*

Kraft bag stock identical with that described in Example 1 was impregnated with a melamine-formaldehyde condensation product, prepared by adding 3 moles of melamine to 10 moles of 30% formaldehyde having a pH of 9.0, heating to boiling during 30 minutes, cooling, and separating and drying the resulting crystals. The paper was tub-sized in an aqueous solution of this resin containing 1% of ammonium sulfate accelerator on the weight of the resin and cured by heating for 1 minute on a drum at 240° F. followed by 10 minutes in an oven at 260° F. The dry tensile strength of the paper was 24.3 lbs.; wet strength, 6.8; wet rub 1486 times; MIT fold 1234; water-resistance 39.3; resin content 2.4% on the dry weight of the paper.

A sample of the impregnated paper was soaked in water for 30 minutes, 3% of alum was added and the solution was heated at 130° F. for an additional 30 minutes. The stock was then disintegrated in the British sheet machine disintegrator and evaluated as in Example 1. The pH of an 0.6% suspension was 4.3, handsheets prepared from the disintegrated stock had a tensile strength of 6.6 lbs. and a Mullen bursting strength of 28.0 lbs. per sq. in. There were practically no fiber clusters in an 0.2% aqueous suspension of the stock.

What I claim is:

1. A method of defibering paper impregnated with a cured acid-curing resin selected from the group consisting of melamine-aldehyde resins and urea and thiourea-aldehyde resins which comprises the steps of heating an acidified aqueous suspension of said paper containing acidic material sufficient to produce a pH of less than about 5 in a 0.6% suspension of the treated stock but not so strongly acid as to destroy the cellulose at elevated temperatures of about 100° F. to 212° F., subjecting the paper to mechanical disintegration and continuing the disintegration until the paper is defibered.

2. A method of defibering paper impregnated with a cured acid-curing resin selected from the group consisting of melamine-aldehyde resins and urea and thiourea-aldehyde resins which comprises the steps of heating an acidified aqueous suspension of said paper containing acidic material sufficient to produce a pH of less than about 5 in a 0.6% suspension of the treated stock but not so strongly acid as to destroy the cellulose at elevated temperatures between the range 100–200° F., subjecting the paper to mechanical disintegration and continuing the disintegration until the paper is defibered.

3. A method of defibering paper impregnated with a cured acid-curing resin selected from the group consisting of melamine-aldehyde resins and urea and thiourea-aldehyde resins which comprises the steps of heating an acidified aqueous suspension of said paper containing acidic material sufficient to produce a pH of less than about 5 in a 0.6% suspension of the treated stock but not so strongly acid as to destroy the cellulose at elevated temperatures between the range 130–180° F., subjecting the paper to mechanical disintegration and continuing the disintegration until the paper is defibered.

4. A method of defibering paper impregnated with a cured acid-curing resin selected from the group consisting of melamine-aldehyde resins and urea and thiourea-aldehyde resins which comprises the steps of heating a suspension of said paper in an aqueous solution of a salt having an acid reaction in water, said solution containing acidic material sufficient to produce a pH of less than about 5 in a 0.6% suspension of the treated stock but not so strongly acid as to destroy the cellulose at temperatures of about 100° F. to 212° F., subjecting the paper to mechanical disintegration and continuing the disintegration until the paper is defibered.

5. A method of defibering paper impregnated with a cured acid-curing resin selected from the group consisting of melamine-aldehyde resins and urea and thiourea-aldehyde resins which comprises the steps of heating a suspension of said paper in an aqueous solution of a salt having an acid reaction in water, said solution containing acidic material sufficient to produce a pH of less than about 5 in a 0.6% suspension of the treated stock but not so strongly acid as to destroy the cellulose at temperatures between the range 130–180° F., subjecting the paper to mechanical disintegration and continuing the disintegration until the paper is defibered.

6. A method of defibering paper impregnated with a cured acid-curing resin selected from the group consisting of melamine-aldehyde resins and urea and thiourea-aldehyde resins which comprises the steps of heating a suspension of said paper in an aqueous solution containing 1% to 10% of alum, based on the weight of the paper, at temperatures of about 100° F. to 212° F., subjecting the paper to mechanical disintegration and continuing the disintegration until the paper is defibered.

7. A method of defibering paper impregnated with a cured acid-curing resin selected from the group consisting of melamine-aldehyde resins and urea and thiourea-aldehyde resins which comprises the steps of heating a suspension of said paper in an aqueous solution containing 1% to 10% of alum, based on the weight of the paper, at temperatures between the range of 130–180° F., subjecting the paper to mechanical disintegration and continuing the disintegration until the paper is defibered.

WALTER M. THOMAS.